(12) United States Patent
West et al.

(10) Patent No.: US 8,131,811 B2
(45) Date of Patent: Mar. 6, 2012

(54) METHODS, APPARATUS AND ARTICLES OF MANUFACTURE TO CONTROL NETWORK ELEMENT MANAGEMENT TRAFFIC

(75) Inventors: Earle West, Morganville, NJ (US); Brian D. Freeman, Farmingdale, NJ (US); Irene M. Shannon, Freehold, NJ (US); Bryan Patrick Sokolik, O'Fallon, MO (US); Salvatore Talamo, Matawan, NJ (US); Robert Urbina Velazquez, Antioch, CA (US); Chesla C. Wechsler, Shrewsbury, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 12/637,032

(22) Filed: Dec. 14, 2009

(65) Prior Publication Data

US 2011/0145337 A1 Jun. 16, 2011

(51) Int. Cl.
*G06F 15/16* (2006.01)
(52) U.S. Cl. ......... 709/206; 709/200; 709/223; 709/224
(58) Field of Classification Search .................. 709/200, 709/206, 223, 224
See application file for complete search history.

(56) References Cited

U.S. PATENT DOCUMENTS

| | | | | |
|---|---|---|---|---|
| 5,878,224 A * | 3/1999 | Smith | | 709/224 |
| 6,345,288 B1 * | 2/2002 | Reed et al. | | 709/201 |
| 6,430,613 B1 * | 8/2002 | Brunet et al. | | 709/223 |
| 6,438,592 B1 * | 8/2002 | Killian | | 709/224 |
| 7,072,962 B2 * | 7/2006 | Hori | | 709/224 |
| 7,237,034 B2 * | 6/2007 | Clarke et al. | | 709/235 |
| 7,305,442 B1 * | 12/2007 | Lundy | | 709/206 |
| 7,512,702 B1 | 3/2009 | Srivastava et al. | | |
| 7,594,022 B2 * | 9/2009 | Warren et al. | | 709/229 |
| 7,752,629 B2 * | 7/2010 | Revanuru et al. | | 718/105 |
| 7,756,034 B2 * | 7/2010 | Donovan et al. | | 370/235 |
| 7,760,639 B2 * | 7/2010 | Donovan et al. | | 370/235 |
| 7,765,305 B2 * | 7/2010 | Smith et al. | | 709/228 |
| 7,840,674 B1 * | 11/2010 | Sterling | | 709/226 |
| 7,953,022 B2 * | 5/2011 | Chun et al. | | 370/252 |
| 2002/0091777 A1 * | 7/2002 | Schwartz | | 709/206 |
| 2002/0099844 A1 * | 7/2002 | Baumann et al. | | 709/232 |
| 2004/0103411 A1 * | 5/2004 | Thayer | | 717/171 |
| 2005/0010961 A1 * | 1/2005 | Hagen et al. | | 725/119 |
| 2006/0075120 A1 * | 4/2006 | Smit | | 709/227 |
| 2006/0112182 A1 * | 5/2006 | Chen et al. | | 709/229 |

(Continued)

OTHER PUBLICATIONS

Adhikari, "Balance the Load on Web Servers," http://www.informationweek.com/674/74iubal.htm, Mar. 23, 1998. (5 pages).

(Continued)

*Primary Examiner* — John Follansbee
*Assistant Examiner* — Anthony Mejia
(74) *Attorney, Agent, or Firm* — Hanley, Flight & Zimmerman, LLC.

(57) ABSTRACT

Example methods, apparatus and articles of manufacture to control network element management traffic are disclosed. A disclosed example apparatus to process an element management system (EMS) query message includes a receiver to receive the EMS query message from a managed network element, the EMS query message being redirected from an EMS server, a responder to select a pre-determined response to the EMS query message and discard EMS information contained in the EMS query message, wherein the pre-determined response is to delay the managed network element from resending the EMS query message to the EMS server for a time period, and a transmitter to send the pre-determined response to the managed network element.

13 Claims, 5 Drawing Sheets

U.S. PATENT DOCUMENTS

| | | | |
|---|---|---|---|
| 2007/0016639 A1* | 1/2007 | Mukundan et al. | 709/203 |
| 2007/0159989 A1* | 7/2007 | Wu et al. | 370/260 |
| 2008/0271101 A1* | 10/2008 | Doherty | 725/114 |
| 2009/0092098 A1* | 4/2009 | Kim | 370/331 |
| 2009/0125569 A1* | 5/2009 | Achtermann et al. | 707/204 |
| 2009/0182842 A1* | 7/2009 | Dutta et al. | 709/218 |
| 2009/0328054 A1* | 12/2009 | Paramasivam et al. | 718/105 |
| 2010/0030735 A1* | 2/2010 | Curtis et al. | 707/3 |
| 2010/0161797 A1* | 6/2010 | Nandagopal et al. | 709/225 |
| 2010/0262664 A1* | 10/2010 | Brown et al. | 709/206 |
| 2010/0271947 A1* | 10/2010 | Abdelal et al. | 370/235 |

OTHER PUBLICATIONS

Wikipedia, "Load balancing (computing)," http://en.wikipedia.org/wiki/Load_balancing_(computing), retrieved on Nov. 23, 2009. (6 pages).

* cited by examiner

METHODS, APPARATUS AND ARTICLES OF MANUFACTURE TO CONTROL NETWORK ELEMENT MANAGEMENT TRAFFIC

FIELD OF THE DISCLOSURE

This disclosure relates generally to network element management traffic and, more particularly, to methods, apparatus and articles of manufacture to control network element management traffic.

BACKGROUND

A centralized element management system (EMS) is commonly used to control and/or manage large numbers of network elements, which may be located at any number and/or type(s) of customer premises. The EMS is also commonly used to monitor the status of the managed network elements. In some examples, the managed network elements periodically and/or aperiodically send EMS query messages to the EMS to update their status and/or confirm connectivity with the EMS, and/or send EMS query messages to the EMS to receive configuration information and/or parameters.

DETAILED DESCRIPTION

Example methods, apparatus and articles of manufacture to control network element management traffic are disclosed. A disclosed example apparatus to process an element management system (EMS) query message includes a receiver to receive the EMS query message from a managed network element, the EMS query message being redirected from an EMS server, a responder to select a pre-determined response to the EMS query message and discard EMS information contained in the EMS query message, wherein the pre-determined response is to delay the managed network element from resending the EMS query message to the EMS server for a time period, and a transmitter to send the pre-determined response to the managed network element.

A disclosed example method includes receiving an EMS query message from a network element, the EMS query message redirected from an EMS server based on at least one of a load, a status or an availability of the EMS server, selecting a pre-determined response to the EMS query message, wherein the pre-determined response is to prevent the network element from resending the EMS query message to the EMS server, discarding all EMS information contained in the EMS query message, and sending the pre-determined response to the network element.

A disclosed example system includes an EMS server, a managed network element to send an EMS query message to the EMS server, a load balancer to redirect the EMS query message when the EMS server is at least one of unable or unavailable to process the EMS query message, and an auto-responder to receive the redirected EMS query message, send a pre-determined response to the managed network element, and discard EMS information contained in the EMS query message.

Another disclosed example apparatus includes a load monitor to determine a load of an EMS server, a load analyzer to determine whether to redirect an EMS query message based on the load of the EMS server, and a redirector to modify routing information for the EMS query message to redirect the EMS query to an EMS shunt server.

Another disclosed example method includes determining an availability of an EMS server, determining whether to redirect an EMS query message based on the availability of the EMS server, and modifying routing information for the EMS query message to redirect the EMS query to an EMS shunt server.

Figure 1:
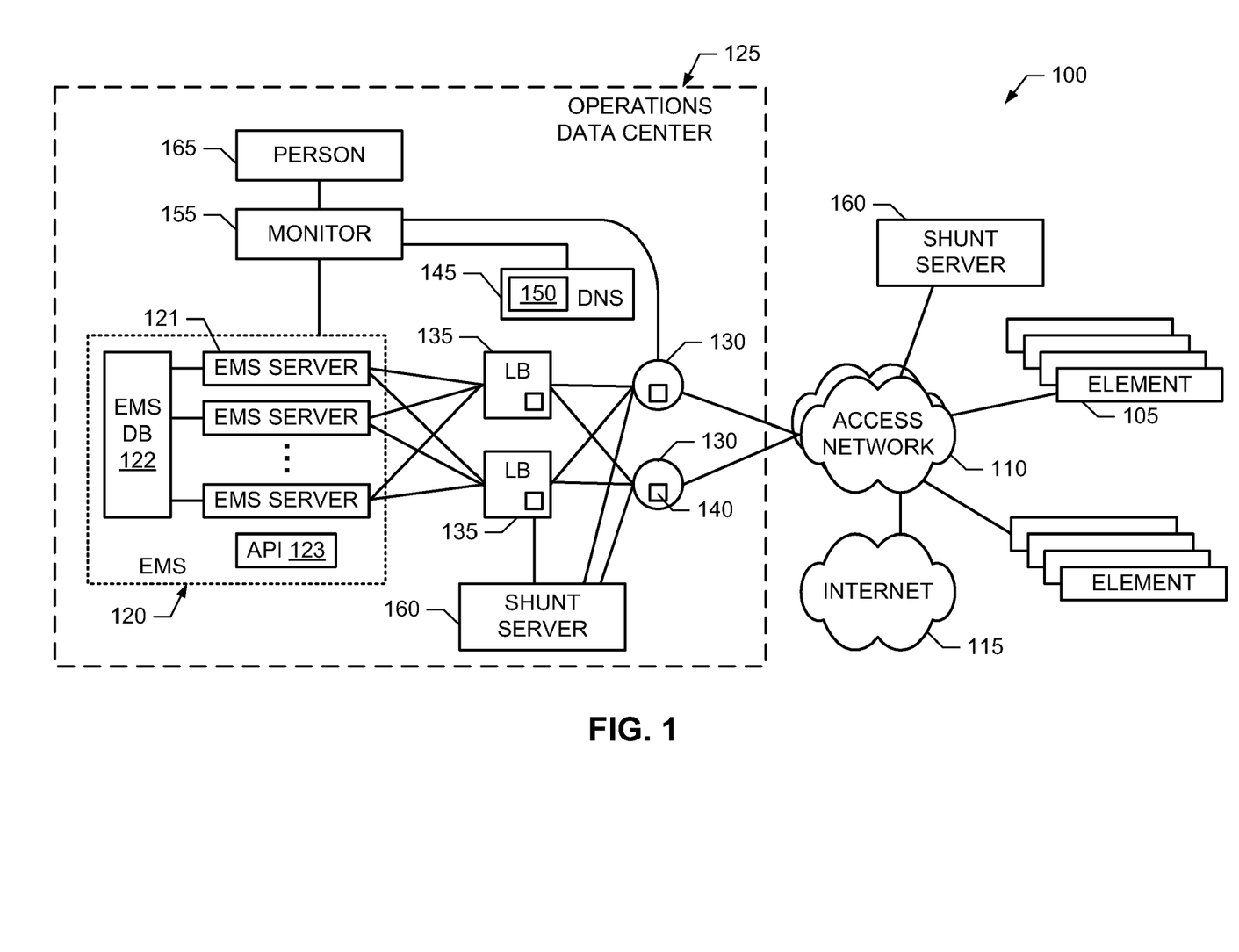
FIG. 1 is a schematic illustration of an example communication system constructed in accordance with the teachings of this disclosure.

FIG. 1 illustrates an example communication system 100 including any number and/or type(s) of managed network elements (one of which is designated at reference numeral 105) that are communicatively coupled to any number and/or type(s) of server(s), private network(s) and/or public network(s) such as the Internet 115 via any number and/or type(s) of access networks (one of which is designated at reference numeral 110). The example managed network elements 105 of FIG. 1 provide data and/or communication services (e.g., telephone services, Internet services, data services, messaging services, instant messaging services, electronic mail (email) services, chat services, video services, audio services, gaming services, etc.) to users of the example communication system 100.

Example managed network elements 105 of FIG. 1 include, but are not limited to, residential gateways, cable modems, digital subscriber line (DSL) modems, wireless modems, wireless access points, cellular telephones, voice over Internet protocol (VoIP) analog terminal adapters, satellite receivers, network adapters, appliances, gaming devices, telemetry devices, media servers, optical network units, and/or set-top boxes. The example managed network elements 105 may be mobile and/or substantially stationary devices, and may be located at and/or in any number and/or type(s) of customer premises, such as residences, government offices, churches, retail establishments, restaurants, sporting venues, transportation centers, libraries, schools, places of business and/or any other private and/or public locations. The example managed network elements 105 of FIG. 1 may be customer owned, may be leased or rented by a customer from a service provider, and/or may be owned by the service provider. The managed network elements 105 may be installed, configured, managed and/or operated by customers and/or service providers.

The example access networks 110 of FIG. 1 may be implemented using any number and/or type(s) of communication path(s), communication media, communication technology(-ies), communication protocol(s) and/or communication device(s). For example, the example access networks 110 may be implemented using DSL-based systems, public switched telephone network (PSTN) systems, public land mobile network (PLMN) systems (e.g., cellular systems), wireless distribution systems, Institute of Electrical and Electronics Engineers (IEEE) 802.16 based distribution systems (a.k.a. WiMAX), wired distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks.

The example managed network elements 105 of FIG. 1 are configured, monitored and/or otherwise managed by one or more EMSs, one of which is designated at reference numeral 120. The example EMS 120 of FIG. 1 is implemented at an operations data center 125. The example EMS 120 and/or, more generally, the example operations data center 125 of FIG. 1 manage the network elements 105 located within a particular geographic area and/or region. As such, the example operations data center 125 of FIG. 1 implements centralized network element management for the geographic area and/or region.

The example EMS 120 of FIG. 1 includes any number and/or type(s) of EMS servers, one of which is designated at reference numeral 121, and an EMS database 122. Network element status information and/or network element configuration information may be stored in the example EMS database 122 using any number and/or type(s) of data structures. The example EMS database 122 may be implemented by any number and/or type(s) of memory(-ies), memory device(s) and/or storage device(s).

The example managed network elements 105 of FIG. 1 are communicatively coupled to the example EMS 120 via the example access network(s) 110, one or more switches, routers and/or hubs (one of which is designated at reference numeral 130), and/or one or more load balancers (one of which is designated at reference numeral 135). The example routers 130 and/or the example load balancers 135 of FIG. 1 route EMS query messages and/or EMS response messages between the example managed network elements 105 and the EMS 120 using any number and/or type(s) of routing protocol(s) and/or routing technology(-ies). In some examples, the routers 130 and/or the load balancers 135 include a routing table and/or a routing policy database, one of which is designated at reference numeral 140, that the routers 130 and/or the load balancers 135 use to determine how to route and/or distribute EMS query messages and/or EMS response messages. Additionally or alternatively, the example routers 130 and/or the example load balancers 135 of FIG. 1 query a domain name service (DNS) server 145 to determine how to route EMS query messages and/or EMS response messages. The example DNS server 145 includes a DNS database 150 containing routing information for a plurality of destinations and/or destination identifiers (e.g., Internet protocol addresses). The example load balancers 135 of FIG. 1 distribute EMS query messages among the example EMS servers 121 to balance the processing loads of the EMS servers 121.

As each EMS query message is received at the example EMS 120 of FIG. 1, at least one of the example EMS servers 121 processes the EMS query message. Some example EMS query messages are status update messages that allow the EMS server 121 to update the status of the managed network element 105 in the example EMS database 122 and/or to confirm connectivity with the managed network element 105. Additional and/or alternative example EMS query messages are configuration request messages that request network element configuration information and/or parameters. The example EMS servers 121 of FIG. 1 respond to each received EMS query message with an EMS response message that, for example, acknowledges the status update, acknowledges connectivity and/or provides the requested configuration information and/or parameters.

When any of the managed network elements 105 sends an EMS query message, the managed network element 105 expects to receive an EMS response message from the EMS 120. When the EMS response message is not received at the managed network element 105 within a pre-determined time period, the managed network element 105 resends the EMS query message to the EMS 120. When a given EMS server 120 is unavailable due to, for example, upgrade, repair, software update, configuration change or other maintenance activity, a loss of power and/or a disruption of a communication path, the subject EMS server 120 is unable to respond to EMS query messages sent by the managed network elements 105. Accordingly, a large number of the managed network elements 105 may continually attempt to resend their EMS query messages. Such a backlog of unprocessed EMS query messages may grow substantially such that when the EMS 120 is again available it may have inadequate processing resources to process the backlog of unprocessed EMS query messages and/or to process newly received EMS query messages. Such a backlog of EMS query messages may also occur when the EMS 120 has insufficient processing resources to process all received EMS query messages (e.g., after a period of downtime for repair) and/or when a regional power outage results in a large number of the managed network elements 105 attempting to re-establish communication with the EMS 120 (e.g., when power is restored).

To reduce a backlog of unprocessed EMS query messages, the example communication system 100 of FIG. 1 includes a monitor 155 and one or more shunt servers and/or auto responders, one of which is designated at reference numeral 160. The example monitor 155 of FIG. 1 monitors the availability, status and/or processing load of the example EMS servers 121 and/or, more generally, the example EMS 120. The example monitor 155 can monitor the availability, status and/or processing load of the EMS servers 121 and/or, more generally, the EMS 120 by sending one or more EMS query messages to the EMS servers 121 and/or, more generally, the EMS 120 via the routers 130 and/or the load balancers 135. By determining whether and/or how long it takes to receive EMS response messages from the EMS 120, the example monitor 155 can estimate the availability, status and/or processing load of the EMS servers 121 and/or, more generally, the EMS 120. Additionally or alternatively, the example monitor 155 of FIG. 1 can access and/or utilize an application programming interface (API) 123 implemented by the example EMS 120 to obtain the availability, status and/or process loading information.

When the example EMS servers 121 and/or, more generally, the example EMS 120 are unavailable due to upgrade, repair, software update, configuration change, maintenance activity, a power loss and/or a disruption of a communication path, and/or have processing loads that may result in a backlog of unprocessed EMS query messages, the example monitor 155 redirects or shunts some or all subsequent EMS query messages to the example shunt server(s) and/or auto responder(s) 160. The redirection or shunting of EMS query messages may, additionally or alternatively, be initiated by a person 165, such as a technician or network operator, via a graphical user interface (GUI) 340 (FIG. 3) of the example monitor 155. The example GUI 340 may be accessed by the person 165 to initiate redirection of EMS query messages prior to an upgrade, a repair, a software update, a configuration change or other maintenance activity being initiated for the example EMS 120. The example monitor 155 may redirect EMS query messages by modifying the example DNS database 150 and/or the example routing tables and/or routing policies 140. If EMS query messages are to be redirected based on processing load rather than unavailability, the example monitor 155 may redirect only some types of EMS query messages to the example shunt server(s) and/or auto responder(s) 160 while other types of EMS query messages are routed to the EMS 120. For example, EMS query messages representing only connectivity checks with the EMS 120 may be shunted to the shunt server(s) 160 while more important EMS query messages are processed by the example EMS 120.

As EMS query messages are received at a particular shunt server and/or auto responder 160 from one of the managed network elements 105, the shunt server and/or auto responder 160 selects and/or sends a pre-determined EMS response message. The pre-determined EMS response message is sent to the managed network element 105 to prevent the managed network element 105 from timing out and, thus, subsequently resending the EMS query message. The shunt server and/or auto responder 160 discards the received EMS query message after sending the pre-determined EMS response message. Thus, a received status update EMS query message does not result in any update of the EMS database 122. Likewise, an EMS query message requesting configuration information and/or parameters does not result in a return of the requested information and/or parameters to the requesting managed network element 105. The example shunt servers and/or auto responders 160 of FIG. 1 do not implement the full functionality of the example EMS 120. The shunt servers and/or auto responders 160 are purposefully designed with limited functionality such that they require limited processing and/or data storage capabilities. Thus, a single workstation may handle the same number of EMS query messages normally requiring a number or workstations or EMS servers 121 to process. The example shunt servers and/or auto responders 160 of FIG. 1 implement only enough EMS messaging functionality to provide pre-determined EMS response messages to prevent the creation of a backlog of EMS query messages. The limited EMS messaging functionality of the example shunt servers and auto responders 160 may result in the loss of network element status information and/or may delay the configuration and/or provisioning of network elements. However, such loss of information may be preferable to the creation of a backlog of EMS query messages, which may not be resolvable. An unresolved backlog of EMS query messages may result in a perpetually inoperable EMS 120, and/or may require the implementation of an overly complex EMS 120 in order to ensure recovery from such conditions. In some examples, the shunt servers and/or auto responders 160 count the number of sent pre-determined EMS messages, and/or record identifiers representing managed network elements to which pre-determined EMS response messages are sent and/or the content(s) of received EMS query messages in a database 217 (FIG. 2) for subsequent retrieval and/or processing by, for example, the EMS 120. Moreover, only the content(s) of particular types of received EMS query messages containing data that may affect network and/or business operations and/or practices may be stored in the database 217 while the content(s) of other types of received EMS query messages are discarded.

In some examples, the pre-determined EMS response message is selected without any reference to any contents (e.g., EMS information, data and/or parameters) of the received EMS query message. For example, an appropriately formatted (e.g., formatted according to the simple object access protocol (SOAP) and/or the extensible markup language (XML)) and acceptable EMS acknowledge (ACK) response message could automatically be sent in response to every received EMS query message. Additionally or alternatively, the EMS response message may be selected from a plurality of pre-determined EMS response messages based on the type of the EMS query message that was received. For example, a status update or connectivity check EMS query message could be responded to with an EMS ACK response message while a configuration request EMS query message could be ignored (i.e., no EMS response message sent) such that the managed network element 105 will resend the configuration request EMS query message at a later time.

As shown in FIG. 1, the example shunt servers and/or auto responders 160 may be implemented at the operations data center 125 and/or may be implemented at different locations of a geographic area and/or region.

While an example communication system 100 has been illustrated in FIG. 1, the elements illustrated in FIG. 1 may be combined, divided, re-arranged, eliminated and/or implemented in any way. Further, the example communication system 100 may include additional devices, databases, servers, systems, networks and/or processors in addition to, or instead of, those illustrated in FIG. 1, and/or may include more than one of any or all of the illustrated devices, databases, servers, networks, systems and/or processors.

Figure 2:
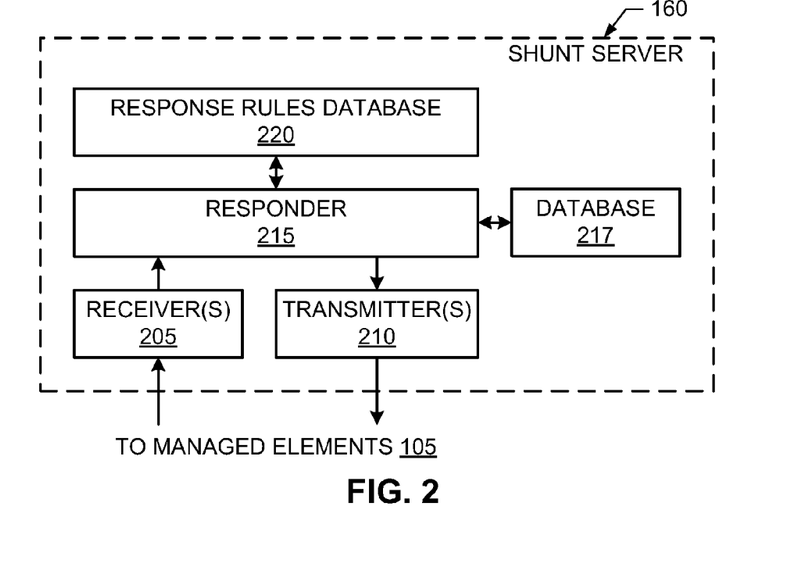
FIG. 2 illustrates an example manner of implementing the example shunt servers of FIG. 1.

FIG. 2 illustrates an example manner of implementing the example shunt servers and/or auto responders 160 of FIG. 1. To receive EMS query messages, the example shunt server 160 of FIG. 2 includes any number and/or type(s) of receivers 205. To transmit EMS query messages, the example shunt server 160 of FIG. 2 includes any number and/or type(s) of transmitters 210. In some examples, the example receivers 205 and the example transmitters 210 may be implemented by a network interface such as a Gigabit Ethernet transceiver.

To select pre-determined EMS response messages, the example shunt server 160 of FIG. 2 includes a responder 215. In some examples, the example responder 215 of FIG. 2 selects a pre-determined EMS response message, such as a generic EMS ACK response message, without any reference to any EMS information, data and/or parameters contained in a received EMS query message. In other examples, the responder 215 selects EMS response messages from a plurality of pre-determined EMS response messages based on the type of EMS query message that was received. In some such examples, a status update or connectivity check EMS query message is responded to with an EMS ACK response message while a configuration request EMS query message is ignored such that the managed network element 105 will resend the configuration request EMS query message at a later time. The example responder 215 may maintain a count of pre-determined EMS response messages that have been sent, and/or counts of different types of pre-determined EMS response messages that have been sent.

In some examples, the shunt server 160 includes a database 217 to record identifiers representative of managed network elements 105 to which pre-determined EMS response messages were sent. The example database 217 of FIG. 2 may also be used to record some or all contents of received EMS query messages for subsequent retrieval and/or processing by, for example, the example EMS 120. The example database 217 may be implemented using any number and/or type(s) of data structures, and may be stored on any number and/or type(s) of memory(-ies), memory device(s) and/or storage device(s).

To specify and/or identify which pre-determined EMS response messages are to be sent in response to which EMS query messages, the example shunt server 160 of FIG. 2 may include a response rules database 220. The example response rules database 220 of FIG. 2 identifies for each of a plurality of EMS query message types which pre-determined EMS response message, if any, is to be sent. The example response rules database 220 may be implemented using any number and/or type(s) of data structures, and may be stored on any number and/or type(s) of memory(-ies), memory device(s) and/or storage device(s).

While an example manner of implementing the example shunt servers and/or auto responders 160 of FIG. 1 has been illustrated in FIG. 2, the interfaces, modules, elements and/or devices illustrated in FIG. 2 may be combined, divided, re-arranged, eliminated and/or implemented in any way. Further, the example receiver(s) 205, the example transmitter(s) 210, the example responder 215, the example databases 217 and 220 and/or, more generally, the example shunt server 160 of FIG. 2 may be implemented by hardware, software, firmware and/or any combination of hardware, software and/or firmware. Thus, for example, any of the example receiver(s) 205, the example transmitter(s) 210, the example responder 215, the example databases 217 and 220 and/or, more generally, the example shunt server 160 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example receiver(s) 205, the example transmitter(s) 210, the example responder 215, the example databases 217 and 220 and/or, more generally, the example shunt server 160 are hereby expressly defined to include a tangible medium such as a memory, a digital versatile disc (DVD), a compact disc (CD), etc. storing the software and/or firmware. Further still, the example shunt server 160 may include additional interfaces, modules, elements and/or devices in addition to, or instead of, those illustrated in FIG. 2, and/or may include more than one of any or all of the illustrated interfaces, modules, elements and/or devices.

Figure 3:
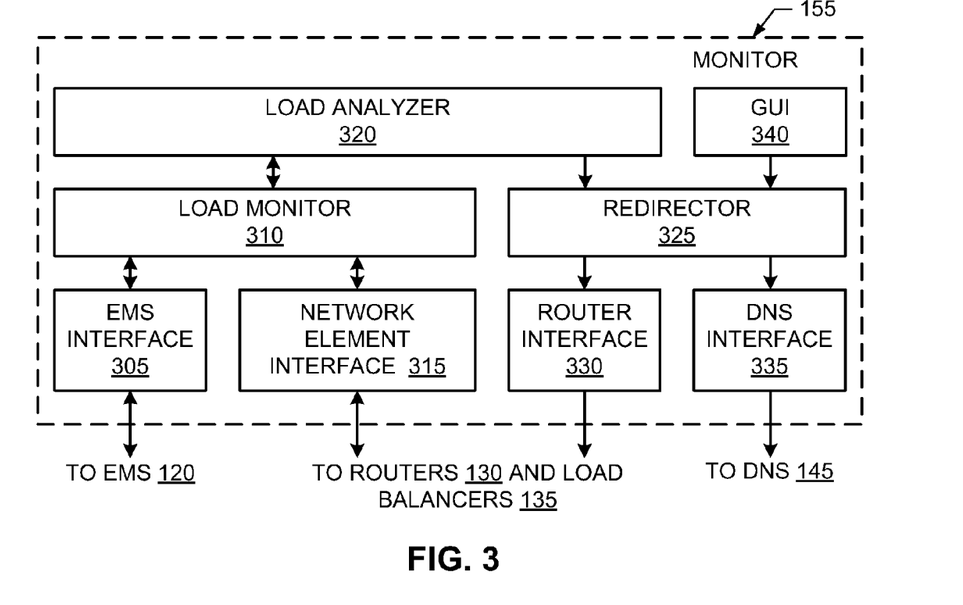
FIG. 3 illustrates an example manner of implementing the example monitor of FIG. 1.

FIG. 3 illustrates an example manner of implementing the example monitor 155 of FIG. 1. To access the example API 123 of the example EMS 120, the monitor 155 of FIG. 3 includes an EMS interface 305. The example EMS interface 305 facilitates the querying of the example API 123 of the example EMS 120 by a load monitor 310 to obtain availability, status and/or processing load information.

To send and receive EMS query messages, the example monitor 155 of FIG. 3 includes a network element interface 315. The example network element interface 315 enables the example load monitor 310 to send EMS query messages and monitor for EMS response messages and/or measure the time required to receive EMS response messages to estimate and/or ascertain the availability, status and/or processing load of the EMS 120.

To determine the availability, status and/or processing load of the example EMS 120, the example monitor 155 includes the example load monitor 310. By accessing the example API 123 via the example EMS interface 305 and/or by sending and receiving EMS messages via the example network element interface 315, the example monitor 155 can estimate, compute, determine and/or otherwise ascertain the availability, status and/or processing load of the EMS 120.

To determine whether EMS query messages are to be redirected, the example monitor 155 of FIG. 3 includes a load analyzer 315. The example load analyzer 315 of FIG. 3 applies one or more rules to the availability, status and/or processing load information obtained and/or determined by the example load monitor 310. Example rules that may be applied to determine which, if any, EMS query messages are to be redirected include, but are not limited to: when the EMS 120 is identified as unavailable, all EMS query messages are redirected; when the processing load exceeds a first threshold, particular types of EMS query messages are redirected; and when the processing load exceeds a second threshold, all EMS query messages are redirected. In some examples, one or more rule parameters and/or thresholds may be adapted, calculated, selected and/or changed based on the behavior of the example communication system 100 of FIG. 1. For example, the load analyzer 320 may collect information relating to current and past shunting events and decide how/whether to shunt. For example, based on the current EMS overload, the number of EMS query messages that the EMS 120 can nominally process per period of time, and the expected or predicted number of EMS query messages per period of time, the load analyzer 320 could select to delay shunting when EMS overload is detected because the EMS 120 should be able to recover from the anticipated EMS query message backlog. However, if the overload continues more than a particular length of time or the EMS overload increases, then the load analyzer 320 could shunt some/all subsequent EMS query messages.

To configure the redirection of EMS query messages, the example monitor 155 of FIG. 3 includes a redirector 325 and a router interface 330 and/or a DNS interface 335. Based on the types of EMS query messages to be redirected, the example redirector 325 of FIG. 3 modifies the example routing tables and/or routing policies 140 via the example router interface 330 and/or modifies the example DNS database 150 via the example DNS interface 335.

To allow a person 165 (FIG. 1) to configure and/or initiate the redirection of EMS query messages, the example monitor 155 of FIG. 3 includes the example GUI 340. Via the example GUI 340 of FIG. 3, the person 160 can configure whether and/or which types of EMS query messages are to be redirected.

While an example manner of implementing the example monitor 155 of FIG. 1 has been illustrated in FIG. 3, the interfaces, modules, elements and/or devices illustrated in FIG. 3 may be combined, divided, re-arranged, eliminated and/or implemented in any way. Further, the example interfaces 305, 315, 330 and 335, the example load monitor 310, the example load analyzer 320, the example redirector 325, the example GUI 340 and/or, more generally, the example monitor 155 of FIG. 3 may be implemented by hardware, software, firmware and/or any combination of hardware, software and/or firmware. Thus, for example, any of the example interfaces 305, 315, 330 and 335, the example load monitor 310, the example load analyzer 320, the example redirector 325, the example GUI 340 and/or, more generally, the example monitor 155 may be implemented by one or more circuit(s), programmable processor(s), ASIC(s), PLD(s) and/or FPLD(s), etc. When any of the appended apparatus claims are read to cover a purely software and/or firmware implementation, at least one of the example interfaces 305, 315, 330 and 335, the example load monitor 310, the example load analyzer 320, the example redirector 325, the example GUI 340 and/or, more generally, the example monitor 155 are hereby expressly defined to include a tangible medium such as a memory, a DVD, a CD, etc. storing the software and/or firmware. Further still, the example monitor 155 may include additional interfaces, modules, elements and/or devices in addition to, or instead of, those illustrated in FIG. 3, and/or may include more than one of any or all of the illustrated interfaces, modules, elements and/or devices.

Figure 4:
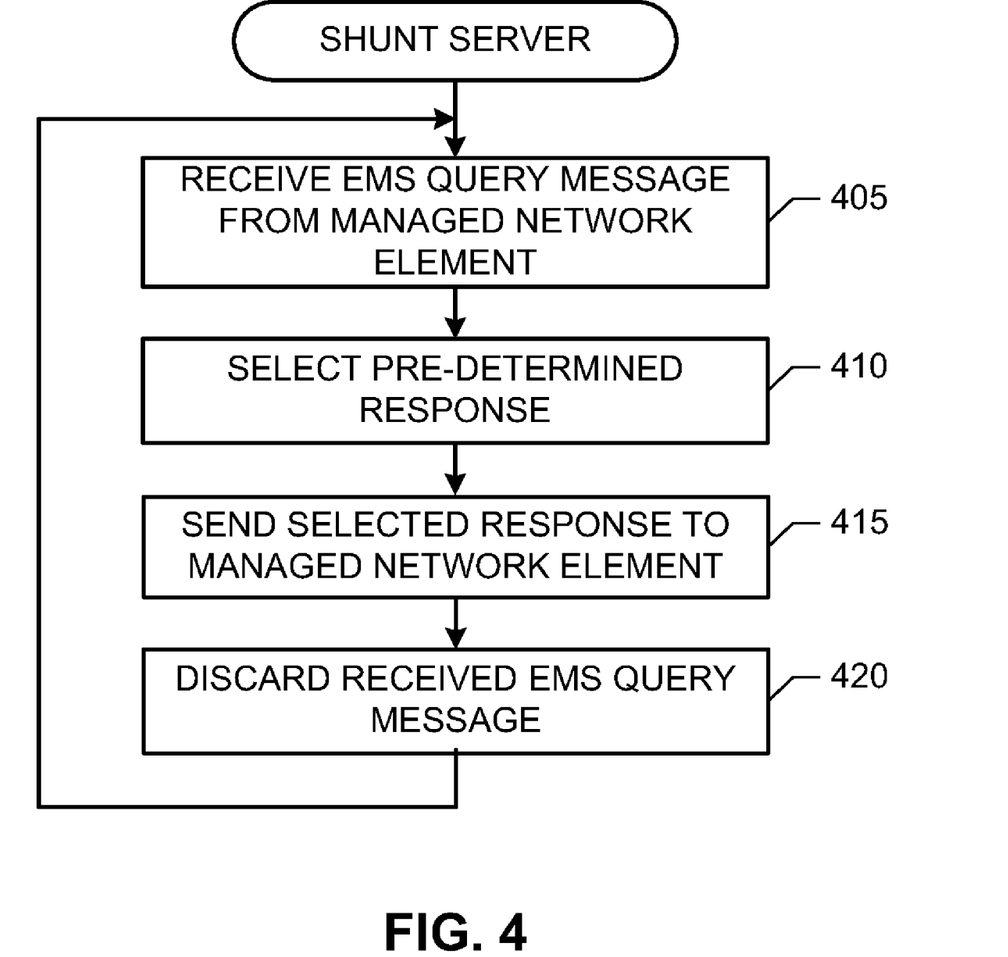
FIG. 4 is a flowchart representative of example machine-accessible instructions that may be executed by, for example, a processor to implement the example shunt servers of FIGS. 1 and 2.
Figure 5:
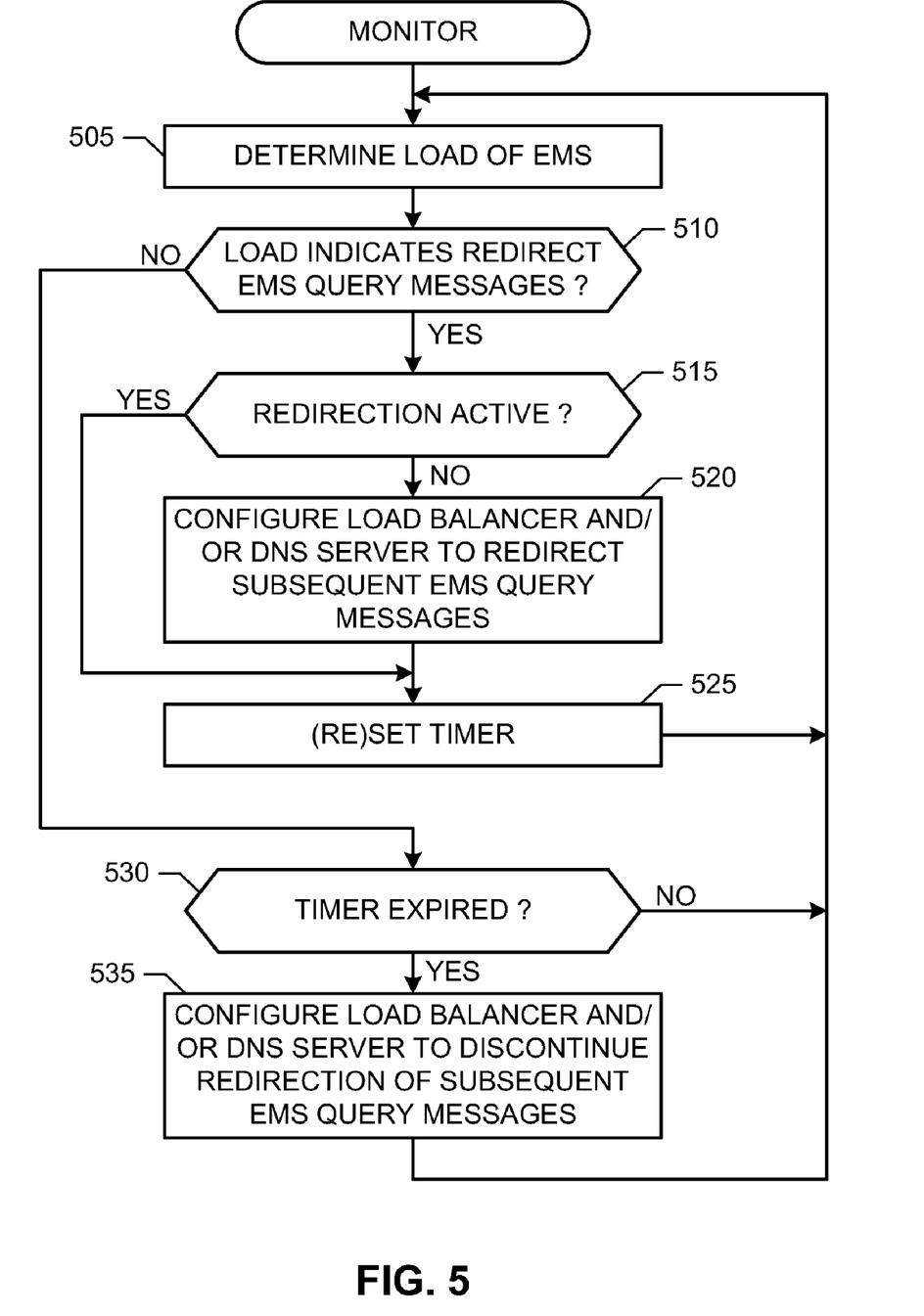
FIG. 5 is a flowchart representative of example machine-accessible instructions that may be executed by, for example, a processor to implement the example monitors of FIGS. 1 and 3.

FIG. 4 is a flowchart representative of example machine-accessible instructions that may be executed to implement the example shunt servers and/or auto responders 160 of FIGS. 1 and 2. FIG. 5 is a flowchart representative of example machine-accessible instructions that may be executed to implement the example monitor 155 of FIGS. 1 and 3. The example machine-accessible instructions of FIGS. 4 and/or 5 may be carried out by a processor, a controller and/or any other suitable processing device. For example, the machine-accessible instructions of FIGS. 4 and/or 5 may be embodied in coded instructions stored on an article of manufacture, such as any tangible computer-readable media. Example tangible computer-readable media include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium which can be used to store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 4 and/or 5 may be implemented using any combination(s) of ASIC(s), PLD(s), FPLD(s), discrete logic, hardware, firmware, etc. Also, some or all of the example processes of FIGS. 4 and/or 5 may instead be implemented manually or as any combination of any of the foregoing techniques, for example, any combination of firmware, software, discrete logic and/or hardware. Further, many other methods of implementing the example operations of FIGS. 4 and/or 5 may be employed. For example, the order of execution of the blocks may be changed, and/or one or more of the blocks described may be changed, eliminated, sub-divided, or combined. Additionally, any or all of the example machine-accessible instructions of FIGS. 4 and/or 5 may be carried out sequentially and/or carried out in parallel by, for example, separate processing threads, processors, devices, discrete logic, circuits, etc.

The example machine-accessible instructions of FIG. 4 begin with the example receiver 205 receiving an EMS query message from a managed network element 105 (block 405). The example responder 215 selects a pre-determined EMS response message (block 410). The pre-determined EMS response message may be selected with or without reference to any EMS information, data and/or parameters contained in the received EMS query message. The example transmitter 210 sends the pre-determined EMS response message selected by the responder 215 to the managed network element 105 (block 415). As described above, in some circumstances no pre-determined EMS response message will be selected and, thus, no pre-determined EMS response message will be sent. The example responder 215 and/or, more generally, the example shunt server and/or auto responder 160 discards the received EMS query message without retaining any EMS information, parameters and/or data and/or without updating the EMS database 122 (block 420). Control then returns to block 405 to wait to receive another EMS query message.

The example machine-accessible instructions of FIG. 5 begin with the example load monitor 310 determining the status, processing load, response time and/or availability of the EMS 120 via the example EMS interface 305 and/or the example network element interface 315 (block 505). Based on the obtained status, processing load, response time and/or availability information obtained and/or determined by the load monitor 310, the example load analyzer 320 determines whether any type(s) of EMS query messages are to be redirected (block 510).

If some type(s) of EMS query messages are to be redirected (block 510), the load analyzer 320 determines whether those type(s) of EMS query messages are already being redirected (block 515). If those type(s) of EMS query messages not already redirected (block 515), the example redirector 325 configures the load balancer(s) 135 and/or the routers 130 to redirect those types of EMS query messages (block 520). The load analyzer 320 sets a timer (block 525), and control returns to block 505 to continue monitoring the status, processing load and/or availability of the EMS 120.

Returning to block 515, if those type(s) of EMS query messages are already being redirected (block 515), the load analyzer 320 resets the timer (block 525), and control returns to block 505 to continue monitoring the processing load and/or availability of the EMS 120.

Returning to block 510, if previously redirected type(s) of EMS query messages are no longer to be redirected (e.g., status, processing load, response time and/or availability of the EMS 120 that caused those EMS query messages to redirected has been resolved and/or no longer are present) (block 510), the example load analyzer 320 determines whether the timer has expired (block 530). If the timer has not expired (block 530), control returns to block 505 to continue monitoring the status, processing load and/or availability of the EMS 120.

If the timer has expired (block 530), the example redirector 325 configures the load balancer(s) 135 and/or the routers 130 to discontinue redirection of those type(s) of EMS query messages (block 535), and control returns to block 505 to continue monitoring the status, processing load and/or availability of the EMS 120.

The illustrated example of FIG. 5 may be applied separately for different types of EMS query messages. For example, different criteria may be applied to the status, processing load, response time and/or availability of the EMS 120 for different types of EMS query messages, and each type(s) of EMS query messages may have different timer durations to control how long their associated redirection continues after the triggering condition is no longer present. Thus, different types of EMS query messages can be redirected at different times (e.g., as the status, processing load, response time and/or availability of the EMS 120 changes).

Figure 6:
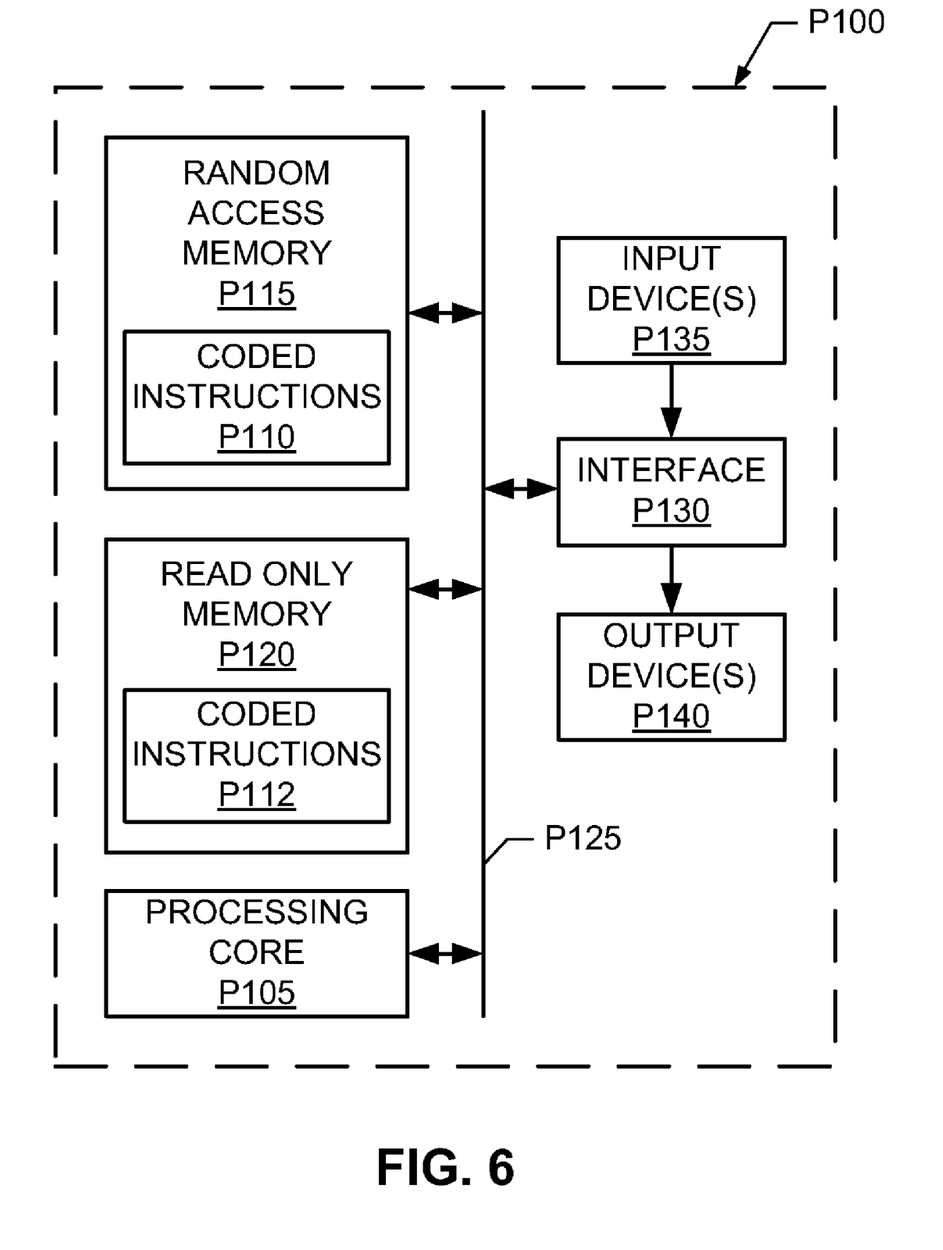
FIG. 6 is a schematic illustration of an example processor platform that may be used and/or programmed to carry out the example machine-accessible instructions of FIGS. 4 and/or 5, implement the example shunt server of FIGS. 1 and 2, and/or to implement any of the example methods, apparatus and articles of manufacture disclosed herein.

FIG. 6 is a schematic diagram of an example processor platform P100 that may be used and/or programmed to implement the example monitors 155 of FIGS. 1 and 3 and/or the example shunt servers and/or auto responders 160 of FIGS. 1 and 2. The example processor platform P100 may be implemented by one or more general-purpose processors, processor cores, microcontrollers, etc.

The example processor platform P100 of FIG. 6 includes at least one programmable processing core P105. The example processing core P105 executes coded and/or machine-accessible instructions P110 and/or P112 stored in the memory space of the processing core P105 (e.g., within a RAM P115 and/or a ROM P120). The example processing core P105 may be any type of processing unit, such as a processor core, a processor and/or a microcontroller. The processing core P105 may execute, among other things, the example machine-accessible instructions of FIGS. 4 and 5 to implement any of the example methods, apparatus and articles of manufacture disclosed herein.

The example processing core P105 is in communication with the memory (including the ROM P120 and/or the RAM P115) via a bus P125. The RAM P115 may be implemented by dynamic random-access memory (DRAM), synchronous dynamic random-access memory (SDRAM), and/or any other type of RAM device, and the ROM P120 may be implemented by flash memory(-ies) and/or any other type of memory(-ies) and/or memory device(s). Access to the memories P115 and P120 may be controlled by a memory controller (not shown). The example memories P115 and/or P120 may be used to implement the example response rules database 220.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example receiver(s) 205, the example transmitter(s) 210, the example interfaces 305, 315, 330 and 335, and/or the example GUI 340.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to process an element management system query message, the apparatus comprising:
    a receiver to receive the element management system query message from a managed network element, the element management system query message being redirected from an element management system server, the element management system query message sent by the managed network element to the element management system server comprising at least one of a status update to update a status of the managed network element, a connectivity check to confirm communicatively coupling of the managed network element to the element management system server, or a configuration request to receive configuration data from the element management system server; and
    a responder to select a response to the element management system query message based on a type of the element management system query message, the responder to:
        when the element management system query message comprises the status update or the connectivity check, discard element management system information contained in the element management system-query message and to send an acknowledgement to the managed network element to indicate to the managed network element that the element management system query message was processed by the element management system server to prevent the managed network element from resending the element management system query message; and
        when the element management system query message comprises the configuration request, discard element management system information contained in the element management system query message and to ignore the element management system query message such that an acknowledgement is not sent to the managed network element to cause the managed network element to resend the element management system query message at a later time,
    wherein at least one of the receiver or the responder is implemented with hardware.

2. An apparatus as defined in claim 1, wherein the responder is to select the response without reference to any element management system information contained in the element management system query message.

3. An apparatus as defined in claim 1, wherein discarding the element management system information comprises at least one of not retaining any of the element management system information contained in the element management system query message or not updating a state of the managed network element based on the element management system information contained in the element management system query message.

4. An apparatus as defined in claim 1, wherein the apparatus is implemented remotely from the element management system server.

5. An apparatus as defined in claim 1, further comprising a database to record an identifier associated with the managed network element when the response is sent to the managed network element.

6. A method comprising: receiving an element management system query message from a managed network element, the element management system query message having been redirected from an element management system the element management system query message been sent by the managed network element to the element management system server and comprising at least one of a status update to update a status of the managed network element, a connectivity check to confirm communicatively coupling of the managed network element to the element management system server, or a configuration request to receive configuration data from the element management system server;
    when the element management system query message comprises the status update or the connectivity check, sending a response to the managed network element to indicate to the managed network element that the element management system query was processed by the element management system server and to prevent the managed network element from resending the element management system query message to the element management system server;
    when the element management system query message is the configuration request, ignoring the element management system query message such that an acknowledgement is not sent to the managed network element to cause the managed network element to resend the element management system query message at a later time; and
    discarding element management system information contained in the element management system query message.

7. A method as defined in claim 6, wherein the response is to prevent the network element from resending the element management system query message to the element management system server until at least one of the load, the status or the availability of the element management system server is resolved.

8. A method as defined in claim 6, further comprising selecting the response without reference to element management system information contained in the element management system query message.

9. A method as defined in claim 6, wherein discarding the element management system information comprises at least one of not retaining any of the element management system information contained in the element management system query message or not updating any state of the network element based on any of the element management system information contained in the element management system query message.

10. A method as defined in claim 6, further comprising recording an identifier representative of the managed network element.

11. A tangible article of manufacture excluding propagating signals and storing machine-readable instructions that, when executed, cause a machine to at least:
  receive an element management system query message from a network element, the element management system query message having been redirected from an element management system server based the element management system query message sent by the network element to the element management system server and comprising at least one of a status update to update a status of the network element, a connectivity check to confirm communicatively coupling of the managed network element to the element management system server, or a configuration request to receive configuration data from the element management system server;
  when the element management system query message comprises the status update or the connectivity check, send a response to the managed network element to indicate to the network element that the element management system query was processed by the element management system server and to prevent the network element from resending the element management system query message to the element management system server;
  when the element management system query message is the configuration request, ignore the element management system query message such that an acknowledgement is not sent to the network element to thereby cause the network element to resend the element management system query message at a later time; and
  discard element management system information contained in the element management system query message.

12. An article of manufacture as defined in claim 11, wherein the machine-readable instructions, when executed, cause the machine to select the response without reference to element management system information contained in the element management system query message.

13. An article of manufacture as defined in claim 11, wherein the machine-readable instructions, when executed, cause the machine to discard the element management system information by at least one of not retaining any of the element management system information contained in the element management system query message or not updating any state of the network element based on any of the element management system information contained in the element management system query message.

* * * * *